Aug. 27, 1929.   R. EISINGER   1,726,143
BOX FOR THE SECRET PACKING OF HYGIENIC RUBBER
PROTECTIVE MEANS OR THE LIKE
Original Filed Jan. 26, 1927
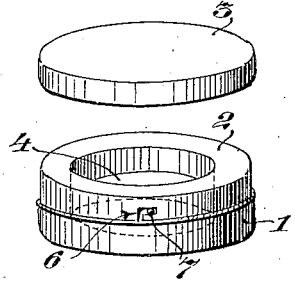
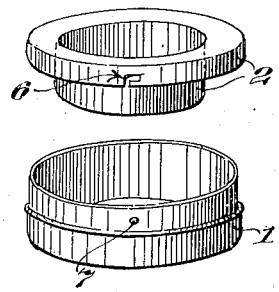
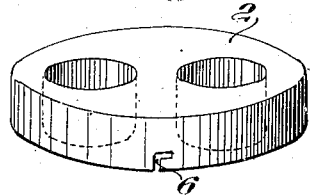

Patented Aug. 27, 1929.

1,726,143

UNITED STATES PATENT OFFICE.

RUDOLF EISINGER, OF VIENNA, AUSTRIA, ASSIGNOR TO JACQUES BALOG, OF VIENNA, AUSTRIA.

BOX FOR THE SECRET PACKING OF HYGIENIC RUBBER PROTECTIVE MEANS OR THE LIKE.

Application filed January 26, 1927, Serial No. 163,732, and in Austria February 12, 1926. Renewed April 29, 1929.

My invention has for object a box for the secret or hidden packing of hygienic articles, especially of rubber protective means or the like and consists in the fitting within the outer casing or box of an interior or nest box independently or separate from the lid or cover of the box, which inner or nest box may be removed as may be desired to render the inner or secret compartment accessible for the removal of its contents or otherwise.

The figures of the accompanying drawing represent the preferred forms of the invention.

Fig. 1 is a perspective view of the box with the inserted nest box, the cover being removed.

Fig. 2 shows also in perspective the nest box and the outer box separately.

Fig. 3 shows the complete box with nest box and cover in sectional view, and,

Fig. 4 shows a duplicate form of the nest box also illustrated perspectively.

The complete box essentially consists of three parts, which are the outer box 1, the nest box 2 and the cover 3. The nest box 2 is a smaller box which has to be inserted in the outer box 1. The rim of the nest box projects outwardly as a flange in such manner that a brim is formed, like an inverted hat, the peripheral edge of the brim fitting over the upper edge of the box 1, as shown in the section, Fig. 3. In the nest box is placed any desired article, soap or the like, while the article 5, protective or the like, lies secreted under the nest box 2 in the main box 1.

In order to fasten the nest box on to the edge of the main box these two parts are connected by means of a bayonet-joint or hinges. In the case of using a bayonet-joint a slot 6 is provided on the brim and a pin 7 therefor on the box 1. The arrangement may be reversed, the slot being provided on the box 1 and the pin on the rim of the nest box. Or instead of the slot a suitable groove may be provided.

If the rim of the nest box rests on the edge of the main box in the closed position and the cover is removed, only the article 4 is visible, whereas the article 5 is out of sight. If the article 5 has to be taken out, then the nest box is turned and removed from the main box.

In using larger boxes it is preferable to insert a nest box with more receptacles as shown in Fig. 4.

The box may also be adjusted in such manner that the diameter of the brim is a little smaller than that of the outer or main box, so that the outer surface of the brim contacts with the inner surface of the box 1. In such case the box preferably is not round, but may be of other suitable form.

It is preferred in some cases to use boxes with a set of nest boxes arranged side by side.

All the arrangements of the invention provide a secret or enclosed and hygienic packing or casing.

What I claim is:—

A box including an outer box section having a bottom wall and side wall, the side wall having its upper portion inwardly offset to provide a vertical flange and a horizontal ledge, a nest box having a bottom and inner vertical wall to define a space within the box, the upper edge of the vertical wall being projected outwardly in the form of a flat ledge, the edge of which is turned downwardly to provide a depending flange, said flange being adapted to snugly engage the inwardly offset portion of the side wall of the outer box and rest upon the ledge, the diameter of the vertical wall of the nest box being less than the diameter of the side wall of the outer box and the height of the vertical wall of the nest box being slightly less than the height of the side wall of the outer box, whereby the parts when assembled present the appearance of a unit box having a thick side wall while at the same time providing a space between the nest box and outer box for the reception of articles to be concealed.

In testimony whereof I affix my signature.

RUDOLF EISINGER.